US012592155B2

(12) United States Patent
Hanel et al.

(10) Patent No.: US 12,592,155 B2
(45) Date of Patent: Mar. 31, 2026

(54) APPARATUS FOR DETECTING TURBULENCE

(71) Applicant: Airbus Defence and Space GmbH, Taufkirchen (DE)

(72) Inventors: Martin Hanel, Taufkirchen (DE); Tobias Rath, Taufkirchen (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 227 days.

(21) Appl. No.: 18/310,026

(22) Filed: May 1, 2023

(65) Prior Publication Data

US 2023/0351905 A1 Nov. 2, 2023

(30) Foreign Application Priority Data

May 2, 2022 (DE) .......................... 102022110727.2

(51) Int. Cl.
*G05D 1/00* (2024.01)
*G08G 5/55* (2025.01)
(Continued)

(52) U.S. Cl.
CPC ............. *G08G 5/55* (2025.01); *G05D 1/0022* (2013.01); *G08G 5/57* (2025.01); *G08G 5/76* (2025.01)

(58) Field of Classification Search
CPC ....................................................... G08G 5/55
See application file for complete search history.

(56) References Cited

U.S. PATENT DOCUMENTS 3,272,973 A 9/1966 MacCready, Jr.
3,875,379 A * 4/1975 Vietor ...................... G08G 5/56
701/121

(Continued)

FOREIGN PATENT DOCUMENTS

EP 1008867 A2 6/2000
EP 3379259 A1 9/2018
(Continued)

OTHER PUBLICATIONS

European Search Report for corresponding European Patent Application No. 23168735.1 dated Sep. 19, 2023; priority document.
(Continued)

*Primary Examiner* — Vivek D Koppikar
*Assistant Examiner* — Paul W Arellano
(74) *Attorney, Agent, or Firm* — Greer, Burns & Crain, Ltd.

(57) ABSTRACT

An apparatus for detecting and evaluating turbulence for an aircraft. The apparatus contains a measuring device for acquiring a value, which indicates a movement of the aircraft relative to the earth, and a second measuring device for acquiring a second value, which indicates a movement of the aircraft relative to the air. The apparatus contains a computing system which receives the two values and determines a difference between the first value and the second value and, on the basis of the difference, a turbulence intensity. The computing system compares the second value with a predefined value range and classifies turbulence as classified turbulence if the second value departs from the predefined value range. The computing system determines the frequency of occurrence of such classified turbulences and detects a turbulent flight state on the basis of the determined turbulence intensity and the frequency of occurrence of the classified turbulences.

8 Claims, 1 Drawing Sheet

(51) Int. Cl.
   *G08G 5/57*    (2025.01)
   *G08G 5/76*    (2025.01)

(56)         References Cited

U.S. PATENT DOCUMENTS

| | | | |
|---|---|---|---|
| 5,130,712 A | 7/1992 | Rubin et al. | |
| 5,187,477 A * | 2/1993 | Glover ................ | G05D 1/0615 |
| | | | 340/963 |
| 6,160,498 A | 12/2000 | Zweifel | |
| 6,161,801 A | 12/2000 | Kelm et al. | |
| 7,523,657 B2 | 4/2009 | Bommier et al. | |
| 7,757,993 B1 | 7/2010 | Hahn | |
| 8,005,583 B2 | 8/2011 | Lacaze et al. | |
| 9,097,799 B2 | 8/2015 | Inokuchi | |
| 10,055,998 B1 | 8/2018 | Reinke et al. | |
| 10,723,480 B1 * | 7/2020 | McCusker ........... | G05D 1/0816 |
| 2007/0260366 A1 | 11/2007 | Lacaze et al. | |
| 2008/0021601 A1 | 1/2008 | Puig | |
| 2010/0070114 A1 | 3/2010 | Puig et al. | |
| 2010/0241294 A1 | 9/2010 | Virelizier et al. | |
| 2012/0259549 A1 | 10/2012 | McDonald | |
| 2015/0028162 A1 | 1/2015 | Wildschek | |

| | | | |
|---|---|---|---|
| 2017/0018125 A1* | 1/2017 | Jover ........................ | G07C 5/02 |
| 2018/0122247 A1 | 5/2018 | Rizzi | |
| 2018/0268715 A1* | 9/2018 | Hampel ................... | G08G 5/76 |
| 2020/0092052 A1* | 3/2020 | MacAfee .................. | H04L 1/08 |
| 2020/0132841 A1 | 4/2020 | Lovering et al. | |
| 2022/0092993 A1* | 3/2022 | Teague ..................... | G08G 5/22 |

FOREIGN PATENT DOCUMENTS

| | | | |
|---|---|---|---|
| WO | 2007042652 A1 | 4/2007 | |
| WO | 2016174618 A1 | 11/2016 | |

OTHER PUBLICATIONS

E. J. Bass, "Towards a Pilot-Centered Turbulence Assessment and Monitoring System" Digital Avionics Systems Conference, IEEE, Search Technology, Inc., Norcross, GA, USA, Oct. 24, 1999.
German Examination Report for corresponding German Patent Application No. 102022110727.2 dated Apr. 24, 2023.
Office Action from corresponding European patent application No. 23168735.1, dated Mar. 3, 2025.

* cited by examiner

APPARATUS FOR DETECTING TURBULENCE

CROSS-REFERENCES TO RELATED APPLICATIONS

This application claims the benefit of German Patent Application Number 10 2022 110 727.2 filed on May 2, 2022, the entire disclosure of which is incorporated herein by way of reference.

FIELD OF THE INVENTION

The present description relates to an apparatus for detecting and evaluating turbulence, and to an aircraft, in particular an unmanned aircraft, having such an apparatus.

BACKGROUND

During a flying phase, aircraft are exposed to external influences due to the weather and the atmosphere. Such influences are, for example, winds, which change over time. These processes of change are referred to as turbulence. Turbulence sometimes has an undesirable effect on the structure of an aircraft, and it may be necessary to adapt a flight path in order to avoid turbulence or to adapt the flight state in order to orient the aircraft, in particular as regards the angle of incidence of the aircraft, so that a load on the structure of the aircraft is kept within specific limit values.

Manned aircraft are generally controlled by a person who is in the aircraft. That person is thus able to experience possible turbulence and the current effects thereof on the aircraft through his own sensory impressions.

In order to forecast turbulence, aircraft are equipped with corresponding technical apparatuses. These make it possible to detect and indicate areas of adverse weather, so that a flight path can be adapted if necessary and the area of adverse weather can be avoided. Such an apparatus is described, for example, in US 2008/021601 A1, which describes an apparatus and a method for detecting air turbulence in the environment of an aircraft.

SUMMARY OF THE INVENTION

An object of the present invention is to improve the operation of an unmanned aircraft so as to make it easier for an operator to respond appropriately to possible turbulence.

This object may be achieved by one or more of the embodiments described herein. Additionally, further embodiments will become apparent from the following description.

An apparatus for detecting turbulence for an aircraft is provided. The apparatus has a first measuring device, a second measuring device and a computing system. The first measuring device is configured to acquire and output a first measured value, which is indicative of a movement of the aircraft relative to the earth. The second measuring device is configured to acquire and output a second measured value, which is indicative of a movement of the aircraft relative to the air. The computing system is in communicative connection with the first measuring device and with the second measuring device and is configured to receive the first measured value and the second measured value. The computing system is configured to determine a difference between the first measured value and the second measured value and, on the basis of the difference, to determine a turbulence intensity. The computing system is configured to compare the second measured value with a predefined value range for the second measured value and to class turbulence as classified turbulence if the second measured value lies outside the predefined value range, wherein the computing system is configured to determine the frequency of occurrence of such classified turbulences. The computing system is configured to detect a turbulent flight state on the basis of the determined turbulence intensity and the frequency of occurrence of the classified turbulences and to transmit information indicative of the turbulent flight state to an operating unit.

The first measuring device and the second measuring device can each be in the form of a sensor, or they can also receive information and, on the basis of that information, perform an operation in order to determine and provide the measured value. If the measuring devices are in the form of sensors, then they generally acquire a physical measured variable and output a signal which correlates with the measured variable and is indicative of the measured parameter.

Each measuring device can be in communicative connection with the computing system wirelessly or in a wired manner in order to transmit its own measured value to the computing system. The measuring devices can spontaneously transmit a measured value to the computing system at regular or irregular time intervals, or the computing system interrogates each measuring device.

The wind strength is determined from the difference between the first and second measured values, that is to say from the difference between the movement of the aircraft relative to the earth and the movement of the aircraft relative to the air. The turbulence intensity is determined from the variation of the wind over time in terms of amplitude and direction.

The computing system compares the second measured value with a predefined value range for the second measured value. Instead of the second measured value, a quantity derived therefrom can also be used. If the second measured value lies outside the predefined value range, turbulence is classed as classified turbulence. The computing system further determines the frequency of occurrence of such classified turbulences.

In one example, the angle of incidence and the angle of yaw are used in this step. The angle of incidence defines an angle between the direction of an oncoming fluid and the chord of a profile, for example the aerofoil. The angle of yaw defines a drift angle between the longitudinal axis of an aircraft and the direction of the oncoming flow speed. The angle of incidence and/or the angle of yaw can be used as the above-mentioned derived quantities and can be compared with a respective value range predefined therefor. Before they are compared with the predefined value range, the angle of incidence and/or the angle of yaw can be fed to suitable signal processing by filtering. In other words, a change in the oncoming flow at the aerofoil or at the wing of the aircraft is used as an indicator for classified turbulence.

The frequency of occurrence of the classified turbulences relates in particular to the number of classified turbulences per unit time. The computing system can, for example, contain a counter which counts the occurrences. The occurrences can be provided with a time stamp in order to determine the frequency of occurrence per unit time. Alternatively, the counter can contain a memory for the occurrences that are classed as classified turbulences, wherein the memory retains the entries for the occurrences only for a specific period of time and erases them when that period of time has elapsed, whereby the number of entries contained in the memory corresponds to the frequency of occurrence based on the time until the entries are erased from the memory.

The first measuring device can determine the movement of the aircraft relative to the earth or another coordinate system or reference frame, for example by determining the position of the aircraft relative to the earth or to the coordinate system and a change of that position over time. There can be used for this purpose, for example, inertial platforms and satellite-based position determination systems, such as, for example, the global positioning system (GPS), Galileo or other such systems.

The second measuring device acquires, for example, the back pressure and the oncoming flow angle of the air and in this manner determines the speed of the aircraft relative to the air. For example, the second measuring device consists of a pitot tube and angle sensors for angles of incidence and yaw. The second measuring device can contain a plurality of individual sensors which measure the speed of the aircraft relative to the air along the three body axes (longitudinal axis, transverse axis, vertical axis), whereby the direction of movement of the relative airflow can also be determined. In this manner, it is possible to determine how turbulence affects the aircraft. This information can likewise be taken into account in order to detect a turbulent flight state and determine a suitable response.

The apparatus described here acquires both the turbulence intensity and the frequency of occurrence of classified turbulences and, on the basis of these two characterizing values, determines a turbulent flight state. If such a turbulent flight state is detected, information thereon is transmitted to an external operating unit so that an operator is informed of the turbulent flight state and is able to take appropriate measures. By acquiring and taking into account both the turbulence intensity and the frequency of occurrence of classified turbulences, a turbulent flight state and thus an excessive load on the structure of the aircraft can be detected with greater reliability and counter-measures can be initiated by the operator in good time, whereby the period of time for which the turbulence acts on the aircraft is reduced. This approach is advantageous in particular for unmanned aircraft, in the case of which an operator is located in an operating station and the effects of the turbulence on the structure of the aircraft cannot be perceived directly through sensory impressions.

Whether turbulence is classed as classified turbulence follows from the comparison with the predefined value range. The predefined value range can, for example, describe a range of states of the aircraft and relate to a plurality of individual parameters, such as, for example, the speed relative to the earth and/or relative to the air, the angle of incidence of the aircraft, a measure of the vibrations or accelerations along the aircraft axes, etc. The predefined value range can describe or define this range of states by indicating for each parameter a value range within which the range of states is deemed to be normal. If at least one parameter departs from the predefined value range, a turbulence is correspondingly classed as classified turbulence. The value ranges can be different for different flight phases. For example, a different value range for the angle of incidence can be deemed to be normal for a take-off phase of the aircraft than during high-speed flight. Empirical values can also be used for determining the predefined value range, in order to determine the values above which turbulence is classed as classified turbulence. The corresponding value ranges are usually determined before the aircraft is brought into service.

Within the context of the present description, the angle of incidence is to be understood as being the angle between the direction of the oncoming airflow and the longitudinal direction of an aircraft. In the event of turbulence, the oncoming flow direction changes and the flow at the aerofoil is no longer uniform, which can lead to stalling and results in a high propeller load. For these reasons, the angle of incidence is preferably kept within a predefined range (it is thus checked whether the angle of incidence lies outside a predefined value range and, if that is the case, a corresponding turbulence is classed as classified turbulence). Turbulence or a gust of wind can lead to the angle of incidence moving outside the predefined range. This can be corrected, for example, by changing the speed of the aircraft.

For example, a turbulence can be defined taking account of the angle of incidence and the oncoming flow speed of the air, based on the aircraft, wherein the three direction components vertical, lateral, longitudinal are taken into account. For the question of the structural load of an aircraft, turbulence in the vertical direction in particular can be highly relevant. It is necessary to respond appropriately to such turbulence in the vertical direction.

According to one embodiment, the computing system is configured to determine a change over time of the difference between the first measured value and the second measured value so as to determine the turbulence intensity on the basis of the change over time.

The change over time of the difference between the first measured value and the second measured value can indicate how the turbulence situation around the aircraft is developing. In particular, the change over time of the difference between the first measured value and the second measured value is an indication of the extent to which the speed of the aircraft relative to the earth changes relative to the speed of the aircraft relative to the air. This change over time of the difference is a measure of the turbulence intensity.

According to a further embodiment, the computing system is configured to determine the frequency of occurrence of the classified turbulences for different units of time.

For example, the frequency of occurrence of the classified turbulences can be determined for a short period of time (such as 3 minutes) and a longer period of time (such as 1 hour) in order to be able to make a more reliable assessment of the turbulence situation. It is also conceivable that the frequency of occurrence is determined for more than two periods of time, wherein each period of time differs in terms of its duration from the duration of all other periods of time.

By determining the frequency of occurrence of the classified turbulences for periods of time of different lengths, the detection of a turbulent flight state can be carried out more reliably.

According to a further embodiment, the computing system is configured to carry out the detection of a turbulent flight state throughout an entire operating time of the aircraft.

The computing system thus performs the steps for detecting a turbulent flight state not only during specific flight phases but during the entire operating time, that is to say during a flight starting with take-off through the flight phase to landing. This is advantageous in particular for unmanned aircraft because monitoring of the flight state thus takes place for the entire flight phase.

According to a further embodiment, the computing system has a plurality of computing units, wherein each computing unit is configured to perform one or more functions of the computing system.

The functions of the computing system as a whole can thus be divided between a plurality of computing units and performed by those computing units. The results of individual processing steps which are performed on separate computing units can thus be used to ultimately perform the function of the computing system as a whole.

The functions of the computing system can be divided between existing computing units. When the functions are divided between a plurality of computing units, at least some of the functions can be performed simultaneously, in order to benefit from the advantages of the parallel performance of computing operations.

According to a further embodiment, at least two of the plurality of computing units are spatially and structurally separate from one another.

The computing units can, for example, be arranged in different functional groups of the apparatus and/or of the aircraft.

According to a further embodiment, a first computing unit is connected to the first measuring device and is configured to determine the turbulence intensity, wherein a second computing unit is connected to the second measuring device and is configured to determine the frequency of occurrence of the classified turbulences.

Further computing units which perform the remaining functions of the computing system can be provided, for example a computing unit which detects the turbulent flight state on the basis of the output values of the first and second computing units can be provided.

According to a further aspect there is provided an aircraft which contains an apparatus as described herein.

The apparatus is installed in the aircraft, or the functions of the computing system are implemented on existing computing units and are performed thereby, wherein the computing units perform the functions using measured values of measuring devices arranged in the aircraft.

According to one embodiment, the apparatus is coupled with a drive unit (engine, propeller, etc.) of the aircraft, and the computing system is configured to generate and output a control command for the drive unit if a turbulent flight state has been detected and to change a speed of the aircraft by means of the control command.

The computing system can be configured to automatically adapt the speed of the aircraft to the detected turbulence so that the load on the structure of the aircraft due to the turbulence is kept within an allowable value range. The computing system can here generate commands to increase or lower the speed of the aircraft, whereby the angle of incidence of the aircraft, for example, is also adapted. By adapting the speed of the aircraft, the angle of incidence in particular can be adapted under the given conditions, that is to say taking account of the turbulence intensity, the frequency of occurrence of classified turbulences and the presence of a turbulent flight state, in order to reduce the structural load on the aircraft under the given conditions.

According to a further embodiment, the aircraft is an unmanned aircraft which can be connected by way of a wireless data transmission channel to an operating station so as to be remotely piloted by an operator.

The aircraft can be, for example, a drone which is controlled by a human operator who, at a distance from the drone in the operating station, receives information about the drone at an operating unit and can input control commands. The drone transmits information about its own flight state to the operating station using a data transmission channel and receives the control commands by way of the same data transmission channel. For this purpose, the drone has an antenna or other air interface which establishes and maintains the data transmission channel with a counterpart station at the operating station.

The apparatus described herein makes it possible, in connection with an unmanned aircraft, to reduce the structural load, because the detection of turbulence and the effect thereof on the aircraft is improved by the approach described herein. As a result, the time for which the unmanned aircraft is exposed to turbulence can be reduced.

BRIEF DESCRIPTION OF THE FIGURES

Exemplary embodiments will be discussed in greater detail hereinbelow with reference to the accompanying drawings. The illustrations are schematic and not true to scale. Identical reference signs refer to identical or similar elements. In the drawings.

DETAILED DESCRIPTION OF EXEMPLARY EMBODIMENTS

Figure 1:
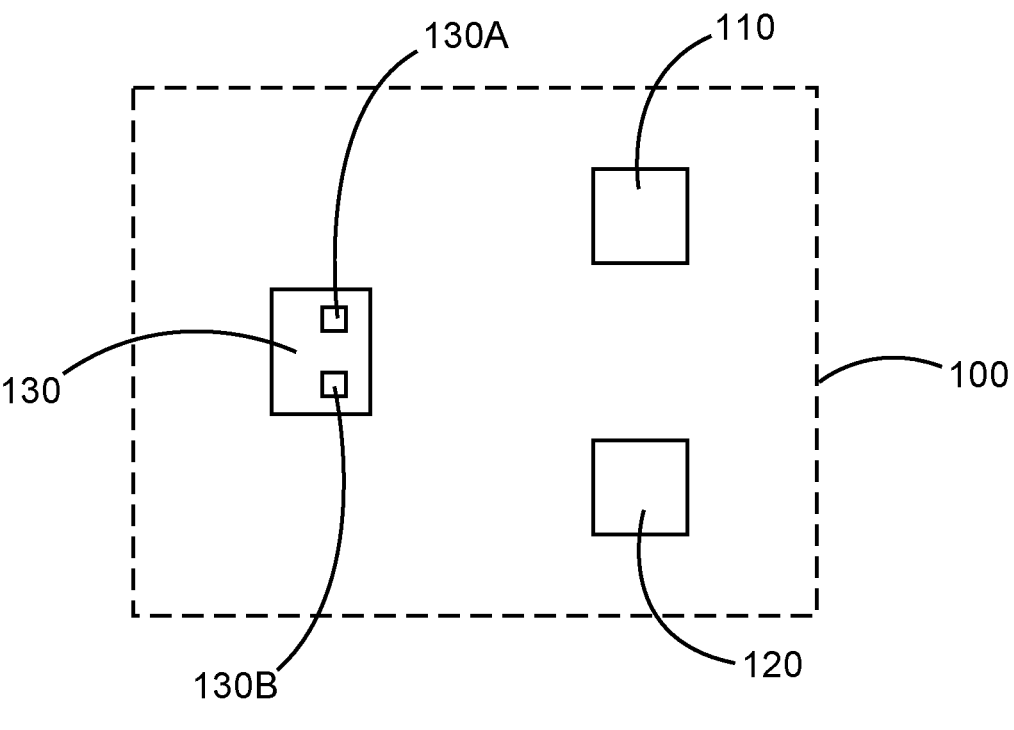
FIG. 1 shows a schematic illustration of an apparatus for detecting turbulence.

FIG. 1 shows an apparatus 100 for detecting turbulence, marked by the dashed box. The apparatus 100 has a computing system 130. The computing system 130 in turn has a first computing unit 130A and a second computing unit 130B. The apparatus 100 further has a first measuring device 110 and a second measuring device 120.

Figure 2:
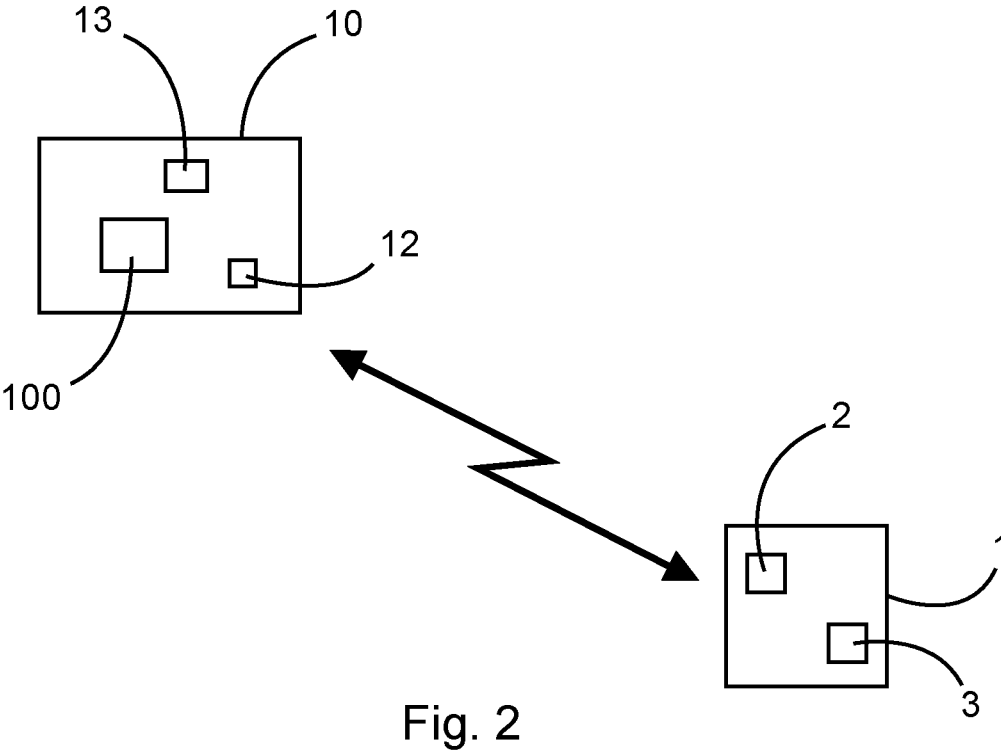
FIG. 2 shows a schematic illustration of an aircraft having an apparatus according to FIG. 1 in conjunction with an operating station, separate from the aircraft, for remote piloting.

The components of the apparatus 100 that are shown are preferably arranged in an aircraft 10 (see FIG. 2). The components 110, 120, 130A and 130B can be spatially and structurally separate from one another and can be so connected to one another by means of data transmission connections that measured values are transmitted from the measuring devices 110, 120 to the individual computing units of the computing system 130 and/or results of individual functions can be communicated between the computing units.

The computing system 130, which is in communicative connection with the first measuring device 110 and with the second measuring device 120, is configured to receive the first measured value and the second measured value from the two measuring devices 110, 120. The computing system 130 determines a difference between the first measured value and the second measured value, in particular a change over time of that difference, in order to determine a turbulence intensity on the basis of the difference, or of the change over time of the difference. The computing system 130 compares the second measured value with a predefined value range for the second measured value and classes turbulence as classified turbulence if the second measured value lies outside the predefined value range. The computing system 130 further determines a frequency of occurrence of such classified turbulences. The computing system 130 detects a turbulent flight state on the basis of the determined turbulence intensity and the frequency of occurrence of the classified turbulences and transmits information indicative of the turbulent flight state to an operating unit 3 (see FIG. 2).

FIG. 2 shows an aircraft 10 in conjunction with an operating station 1. The aircraft 10 has an apparatus 100 for detecting turbulence as described in FIG. 1. The aircraft 10 additionally has a drive unit 13 and a communication interface 12. The operating station 1 is usually a stationary unit which is arranged on the ground and has a communication interface 2 and an operating unit 3.

A wireless data transmission channel 20 is established between the communication interface 2 and the communication interface 12. By way of the channel 20, the aircraft 10 transmits information indicative of a turbulent flight state to the operating unit 3. An operator is associated with the operating unit 3. The information about the flight state of the aircraft 10 is displayed to the operator, for example by way of a display. The operating unit 3 additionally also has input elements by way of which the operator is able to input commands, which are transmitted to the aircraft by way of the channel 20. Thus, an operator is able to respond appropriately to a detected flight state of the aircraft 10 and input and transmit to the aircraft 10 the suitable commands, for example to increase or reduce the speed, change the flight direction, etc. Specifically because the operator is spatially separate from the aircraft 10, it is expedient and relevant if the operator receives information about a turbulent flight state that is as reliable and accurate as possible, in order that he can respond appropriately thereto even though the operator does not himself experience any sensory impressions of the flight state.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 operating station
2 communication interface
3 operating unit
10 aircraft
12 communication interface
13 drive unit
20 wireless data transmission channel
100 apparatus for detecting turbulence
110 first measuring device
120 second measuring device
130 computing system
130A, B computing unit

The invention claimed is:

1. An unmanned aircraft, comprising an apparatus for detecting turbulence, the apparatus comprising:
   a first sensor configured for acquiring and outputting a first measured value, which is indicative of a movement of the aircraft relative to the earth;
   a second sensor configured for acquiring and outputting a second measured value, which is indicative of a movement of the aircraft relative to the air;
   a computing system which is in communicative connection with the first sensor and with the second sensor and which is configured to receive the first measured value and the second measured value;
   wherein the computing system is further configured to:
      determine a difference between the first measured value and the second measured value;
      determine a wind strength based on the difference between the movement of the aircraft relative to the earth and the movement of the aircraft relative to the air;

determine a turbulence intensity based on the difference between the first measured value and the second measured value and additionally based on a variation of the wind strength over time in terms of amplitude and direction;

compare the second measured value with a predefined value range for the second measured value;

detect an angle of incidence defining an angle between the direction of an oncoming fluid and an aerofoil of the aircraft, and detect an angle of yaw defining a drift angle between a longitudinal axis of the aircraft and the direction of the oncoming flow, and determine a variation of the oncoming flow at the aerofoil of the aircraft based on the angle of yaw and the angle of incidence; and classify instances of turbulence when the second measured value lies outside the predefined value range and additionally based on the variation of the oncoming flow at the aerofoil of the aircraft and to determine a frequency of occurrence of such classified turbulences; and detect a turbulent flight state on a basis of the determined turbulence intensity and the frequency of occurrence of the classified turbulences and to transmit information indicative of the turbulent flight state to a remote operator terminal for controlling operation of the aircraft;

wherein the apparatus is coupled with a drive unit of the aircraft;

wherein the computing system is configured to generate and output a control command for the drive unit when a turbulent flight state has been detected, and to change a speed of the aircraft by means of the control command to thereby adapt an angle of incidence of the aircraft.

2. The unmanned aircraft as claimed in claim 1, wherein the computing system is further configured to determine a change over time of the difference between the first measured value and the second measured value so as to determine the turbulence intensity on the basis of the change over time.

3. The unmanned aircraft as claimed in claim 1, wherein the computing system is further configured to determine the frequency of occurrence of the classified turbulences for different units of time.

4. The unmanned aircraft as claimed in claim 1, wherein the computing system is configured to detect of a turbulent flight state throughout an entire operating time of the aircraft.

5. The unmanned aircraft as claimed in claim 1, wherein the computing system has a plurality of computers, and wherein each computer is configured to perform one or more functions of the computing system.

6. The unmanned aircraft as claimed in claim 5, wherein at least two computers from the plurality of computers are spatially and structurally separate from one another.

7. The unmanned aircraft as claimed in claim 6, wherein a first computer is connected to the first sensor and is configured to determine the turbulence intensity, and wherein a second computer is connected to the second sensor and is configured to determine the frequency of occurrence of the classified turbulences.

8. The unmanned aircraft as claimed in claim 1, wherein the aircraft is configured to be connected by way of a wireless data transmission channel to an operating station so as to be remotely piloted by an operator.

* * * * *